US009959666B2

(12) United States Patent
Tipton (10) Patent No.: US 9,959,666 B2
(45) Date of Patent: May 1, 2018

(54) METHOD AND APPARATUS FOR ADDING DETAIL TO A 3D SOLID MODEL USING A SECONDARY GEOMETRIC REPRESENTATION

(75) Inventor: Bob Tipton, Woburn, MA (US)

(73) Assignee: 3D Systems, Inc., Rock Hill, SC (US)

( * ) Notice: Subject to any disclaimer, the term of this patent is extended or adjusted under 35 U.S.C. 154(b) by 1727 days.

(21) Appl. No.: 13/106,387

(22) Filed: May 12, 2011

(65) Prior Publication Data

US 2012/0069016 A1 Mar. 22, 2012

Related U.S. Application Data

(60) Provisional application No. 61/334,508, filed on May 13, 2010.

(51) Int. Cl.
*G06T 17/00* (2006.01)
*G06T 19/20* (2011.01)

(52) U.S. Cl.
CPC .............. *G06T 17/00* (2013.01); *G06T 19/20* (2013.01); *G06T 2219/2021* (2013.01)

(58) Field of Classification Search
CPC .. G06T 17/00; G06T 19/20; G06T 2219/2021
USPC ......................................................... 345/420
See application file for complete search history.

(56) References Cited

U.S. PATENT DOCUMENTS

| 2001/0038705 A1* | 11/2001 | Rubbert et al. ............... 382/128 |
| 2004/0100465 A1* | 5/2004 | Stowe et al. .................. 345/427 |
| 2005/0128210 A1* | 6/2005 | Berger ........................... 345/582 |
| 2006/0109269 A1* | 5/2006 | Jennings et al. .............. 345/424 |

* cited by examiner

*Primary Examiner* — Peter Hoang
(74) *Attorney, Agent, or Firm* — Choate, Hall & Stewart LLP; William R. Haulbrook; Alexander D. Augst (57) ABSTRACT

The invention is directed to systems and methods for detailing a graphical 3D solid model displayed to a user. An example system includes a graphical user interface device (e.g., joystick, keyboard, stylus, roller ball, touch screen, tablet, etc.) configured to receive input from a user and transmit the input to a computer including a Central Processing Unit (CPU) and/or a Graphics Processing Unit (GPU), a memory for use with the computer, and a video display configured to graphically display the detailed 3D solid model to the user.

11 Claims, 15 Drawing Sheets

METHOD AND APPARATUS FOR ADDING DETAIL TO A 3D SOLID MODEL USING A SECONDARY GEOMETRIC REPRESENTATION

CROSS-REFERENCE TO RELATED APPLICATION

This application claims priority to and the benefit of, and incorporates herein by reference in its entirety, U.S. Provisional Patent Application No. 61/334,508, which was filed on May 13, 2010.

FIELD OF THE INVENTION

The present invention relates generally to the field of three-dimensional (3D) solid modeling, and more particularly to an improved method for adding detail to a virtual 3D solid model via a computational technique that makes use of a secondary geometric representation of the 3D solid model.

BACKGROUND OF THE INVENTION

Solid modeling programs, such as those provided by Dassault Systèmes SolidWorks Corporation (e.g., SolidWorks®) and Parametric Technology Corporation (PTC®) (e.g., Pro/ENGINEER), are in common use by engineers and designers to create 3D solid models for simulation and/or manufacture. Unlike other geometric computing programs, solid modeling places an emphasis on physical fidelity, informational completeness, and universality of algorithms and representations. This emphasis allows solid modelers to automate difficult engineering calculations that are carried out as part of the design process.

The emphasis on physical fidelity, however, makes it difficult to add detail elements, such as textures or embossments, directly to a solid model design. For example, in typical CAD programs, solid models are represented as closed collections of surfaces, such as planar, quadrics, or NURBS surfaces (non-uniform rational B-splines). The nature of these surfaces is not well suited to capturing detail elements or performing operations such as embossing or debossing. A designer could create a textured or embossed surface one element of the model at a time, but this would be impractical due to the large number of operations required. For example, a typical NURBS surface may be represented by an array of 200×200 control points, for a total of 40,000 control points. Individually modifying position and tangent vectors associated with each of these 40,000 control points would be cumbersome.

Figure 1:
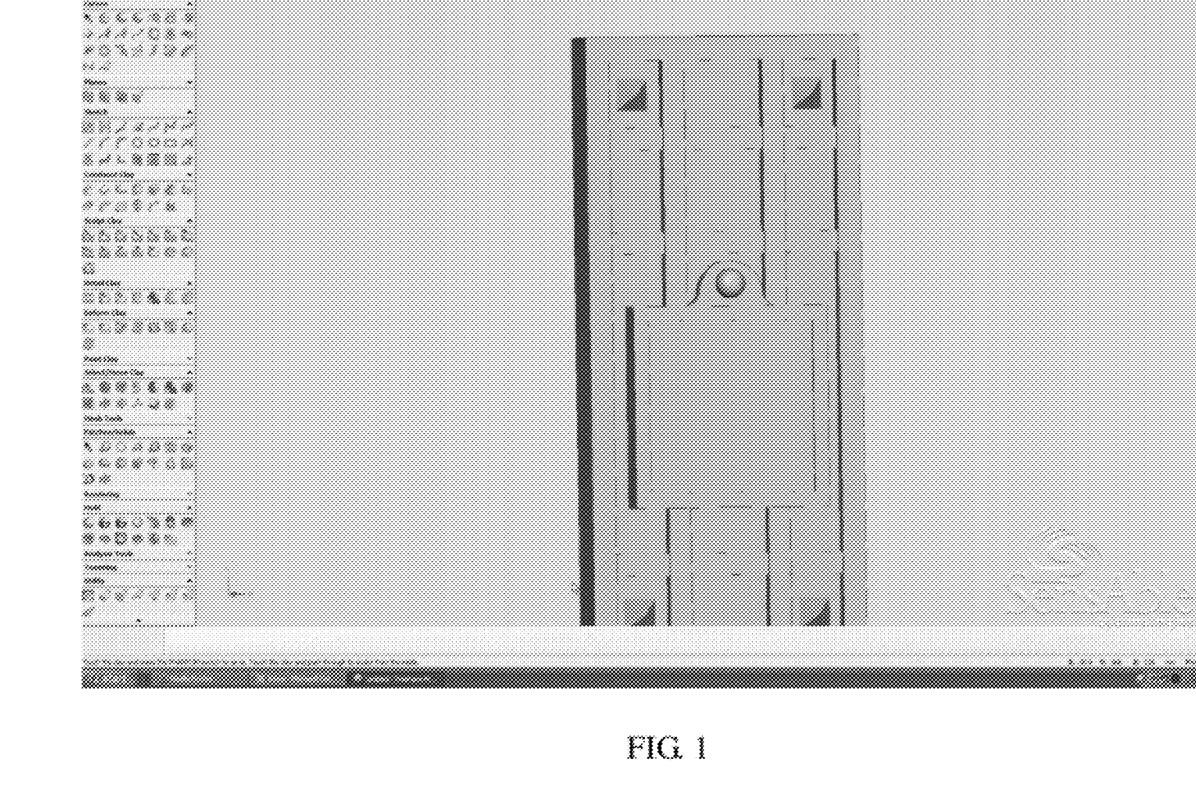
FIG. 1 is a screenshot from a graphics software application illustrating a model of a baseplate for a door handle, in accordance with one embodiment of the invention.

As an example of how a solid model is used in a typical manufacturing process, consider the model of a baseplate for an exterior door handle, shown in FIG. 1. To manufacture the baseplate, a typical process uses the solid model, which lacks texturing and detail, to produce a mold. After the mold has been created, any desired texturing or detail is then added directly to the mold and/or molded part using, for example, hand tools or chemical processes.

This workflow has significant disadvantages. Specifically, because the solid model lacks texturing and detail, the texturing and detail must be added to the mold and/or molded part using extra steps. This increases manufacturing costs and makes it difficult to create multiple molds and parts with identical detailing elements. Considering the above, there is a need for a simple and efficient way to add detail to a 3D solid model.

SUMMARY OF THE INVENTION

The present invention is directed towards improved systems and methods for adding graphical detail to a virtual 3D solid model via a computational technique making use of a secondary geometric representation of the 3D solid model. More particularly, various embodiments of the invention provide methods and devices for adding detailed shapes directly to a solid model so that molds or other manufacturing articles may be created directly in a repeatable fashion. Various embodiments of the invention may, for example, provide methods and devices for adding this detailing to a 3D solid model, without requiring tedious, manual operations from the designer.

In one aspect, a system is provided for detailing a graphical 3D solid model displayed to a user. The system includes a graphical user interface device configured to receive input from a user and transmit the input to a computer, the computer including a Central Processing Unit (CPU) and/or a Graphics Processing Unit (GPU). The system also includes a memory for use with the computer. The memory includes computer software configured to: (a) identify a region of the 3D solid model where detail is to be added, according to user input; (b) create a secondary geometric representation based on the identified region in (a); (c) add detail to the secondary geometric representation according to user input, wherein the addition of detail includes at least one member selected from the group consisting of embossing, debossing, carving, acquiring, and/or adding 3D data, and texture mapping; (d) create a new surface by sampling the detailed secondary geometric representation, wherein creation of the new surface is optionally controlled with one or more of the following: (i) a level of smoothing of the secondary geometry; (ii) a number of split tiles for a trimmed region; and/or (iii) an amount of voxel oversampling within each tile; and (e) integrate the new surface in (d) into the 3D solid model using the region identified in (a), thereby producing a detailed 3D solid model. The system also includes a video display configured to graphically display the detailed 3D solid model to the user.

In certain embodiments, the secondary geometric representation includes a voxel-based representation, a polygon mesh, and/or a point cloud. The secondary geometric representation may be a voxel-based representation. The region where detail is to be added may include a surface face. In one embodiment, a curve defines the secondary geometric representation, the detail to be added to the region, and/or a boundary of the region where detail is to be added. The new surface created by sampling the geometric representation may include a NURBS surface.

In another embodiment, the memory includes computer software to (i) derive a location and surface normal at sub-voxel resolutions for the NURBS surface, (ii) oversample and smooth the secondary representation to minimize ripple patterns, (iii) create the new surface through the use of a convolution algorithm, (iv) simulate the new surface with a mirrored surface, thereby highlighting small variations and ripples, and/or (v) transfer the detail to a manufacturing article, such as a mold. The graphical user interface may be a joystick, a keyboard, a stylus, a roller ball, a touch screen, and/or a tablet.

In another aspect, a method is provided for detailing a virtual 3D solid model. The method includes the steps of: (a) identifying a region of the virtual 3D solid model where detail is to be added, according to user input, (b) creating a secondary geometric representation based on the identified region, (c) adding detail to the secondary geometric repre-} sentation according to user input, wherein adding detail includes at least one of embossing, debossing, carving, acquiring, and/or adding 3D data, and texture mapping, (d) creating a new surface by sampling the detailed secondary geometric representation, and (e) integrating the new surface into the 3D solid model using the identified region, thereby producing a detailed 3D solid model. The description of elements of the embodiments above can be applied to this aspect of the invention as well.

In certain embodiments, creating the new surface is optionally controlled with one or more of (i) a level of smoothing of the secondary geometry, (ii) a number of split tiles for a trimmed region, and/or (iii) an amount of voxel oversampling within each tile. The secondary geometric representation may include a voxel-based representation, a polygon mesh, and/or a point cloud. The secondary geometric representation may be a voxel-based representation. In one embodiment, the region where detail is to be added includes a surface face. A curve may define the secondary geometric representation, the detail to be added to the region, and/or a boundary of the region where detail is to be added.

In one embodiment, creating the new surface includes deriving a NURBS surface, smoothing the secondary geometry, and/or using a convolution algorithm. Adding detail may include subdividing the region into a plurality of tiles, and creating the new surface may include deriving a NURBS surface for a tile. The integrating step may include simulating the 3D solid model with a mirrored surface to highlight small variations and ripples. The method may also include transferring the detail to a manufacturing article, such as a mold.

These and other objects, along with advantages and features of the present invention herein disclosed, will become more apparent through reference to the following description, the accompanying drawings, and the claims. Furthermore, it is to be understood that the features of the various embodiments described herein are not mutually exclusive and can exist in various combinations and permutations.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention. In the following description, various embodiments of the present invention are described with reference to the following drawings, in which.

DETAILED DESCRIPTION OF THE INVENTION

Example 3D modeling systems for use with the invention described herein include those manufactured by SensAble Technologies, Inc. of Woburn, Mass., such as, but not limited to, the FreeForm® systems (i.e., touch-enabled solutions for fast 3D modeling of complex, highly-detailed, organic shapes for manufacturing) and the SensAble Dental Lab System (i.e., an integrated digital solution to scan, design, and fabricate common dental restorations). FreeForm® systems and the SensAble Dental Lab systems (SDLS) both use a voxel representation to capture the volume and surface of 3D geometric shapes, referred to as clay. One user function common to both FreeForm® and SDLS is the application of a texture to the voxel data to represent an embossed (or debossed) offset to the three-dimensional surface. In FreeForm®, this feature may be applied to add detail to clay models from images.

In certain embodiments, the present invention provides methods and systems for adding detailed shapes directly to a solid model so that molds or other manufacturing articles can be created directly in a repeatable fashion. The detail may be added to the 3D solid model without requiring numerous tedious, manual operations from the designer.

Because of an emphasis on simulation and physical fidelity, typical CAD software represents solid models as closed collections of surfaces, such as planar, quadrics or NURBS surfaces. The nature of these mathematical surfaces is not well suited to capturing detail elements or performing detailing operations, such as embossing or debossing, as would be naturally encountered. A designer could create a textured surface one element at a time, but the number of operations required may be enormous.

In one embodiment, a secondary geometric representation is introduced that is based on sampled geometry, such as voxels, polygon meshes, and/or point clouds, rather than a collection of mathematical surfaces, as used in solid models. One embodiment for this secondary geometric representation is voxel based, as described below.

Figure 2:
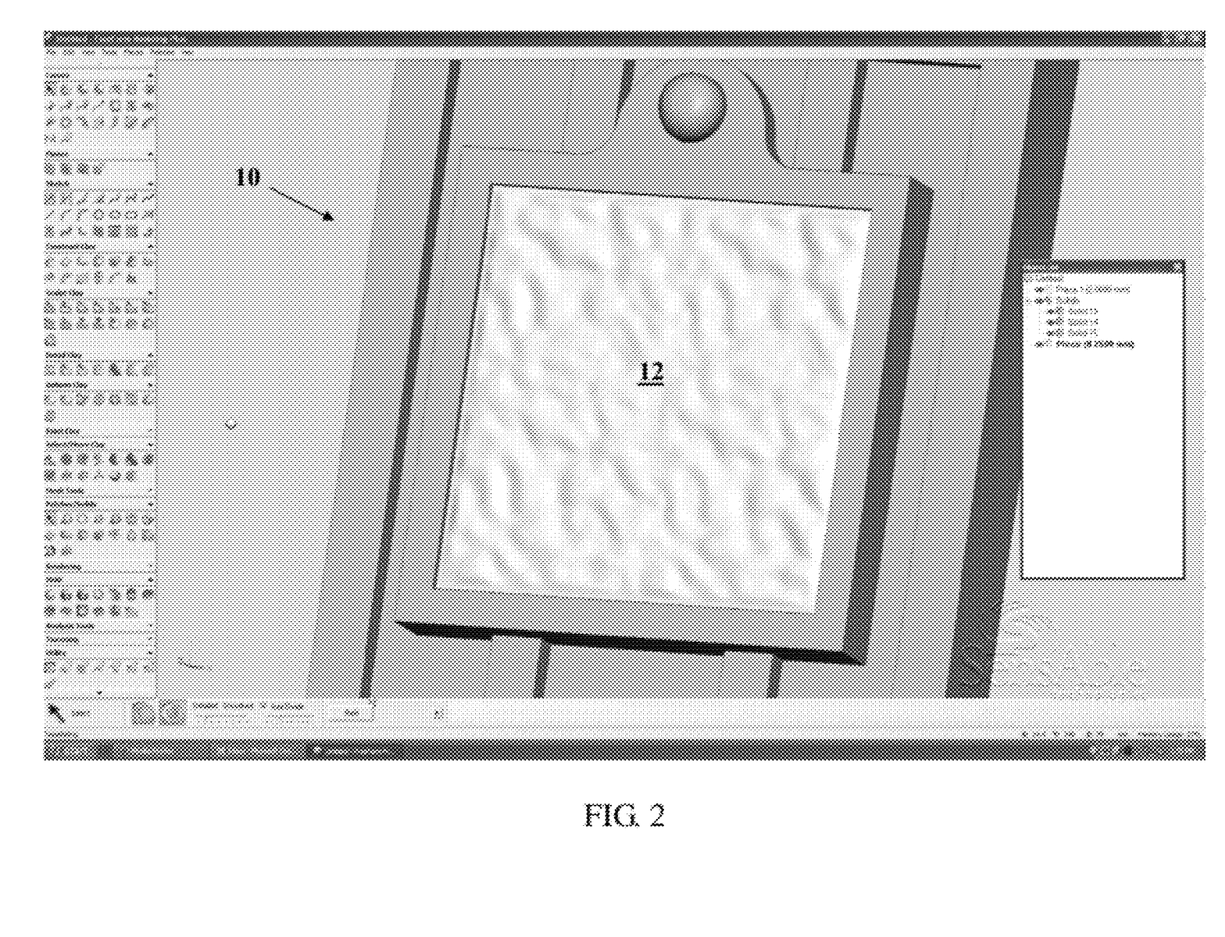
FIG. 2 is a screenshot of the baseplate model of FIG. 1, with texture added to the baseplate, in accordance with one embodiment of the invention.

The secondary geometric representation is used to capture the design intent of the detailing operation. For example, detailing operations, such as embossing, may be performed directly on the secondary geometric representation. The detailed secondary geometry may then be used to create a new collection of surfaces that includes the added detail. For example, as described below, the new surfaces may be created by sampling the secondary geometric representation. Existing surfaces in the original 3D solid model may then be replaced with the new surfaces to create a detailed 3D solid model. FIG. 2 depicts an example baseplate 10 for a door handle, with a texture 12 added to the baseplate 10, in accordance with an embodiment of the invention.

Figure 3:
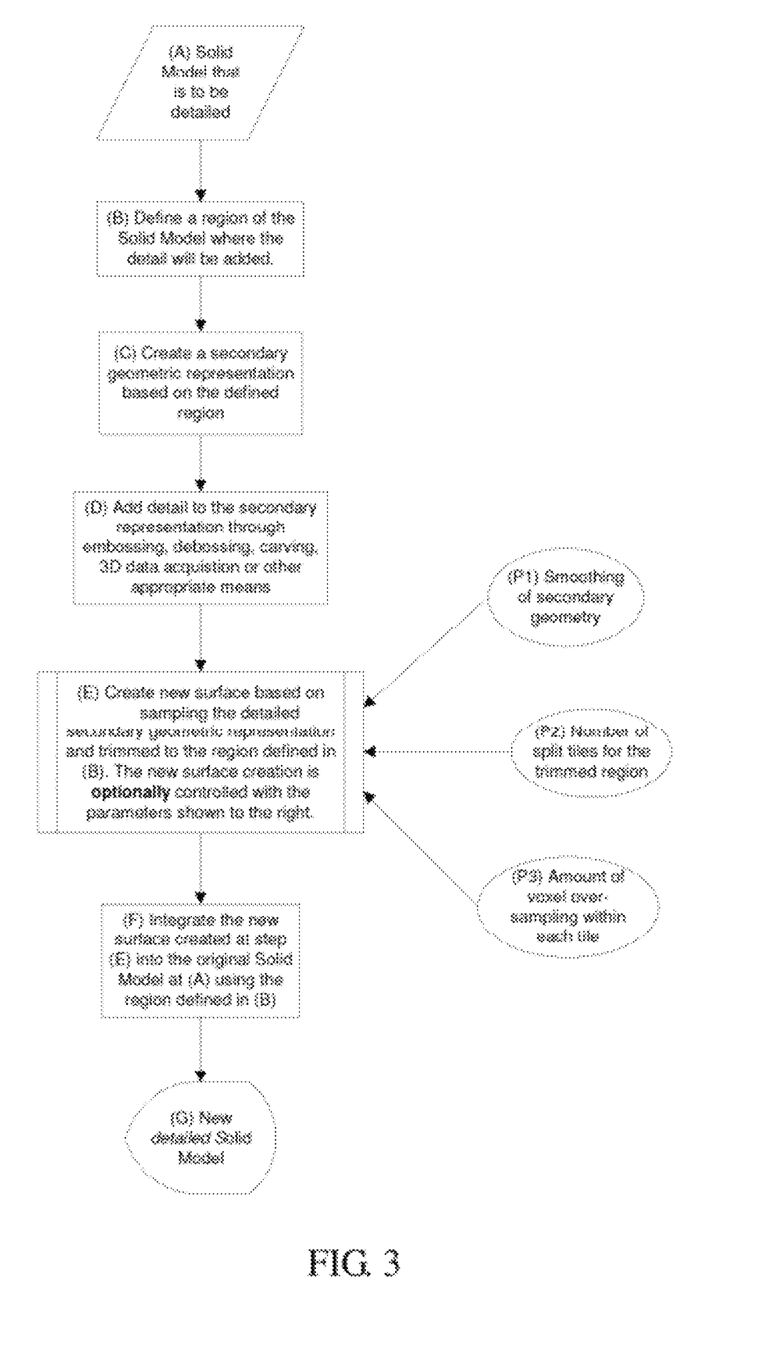
FIG. 3 is a flowchart of an illustrative method of adding detail to a solid model, in accordance with one embodiment of the invention.
Figure 4:
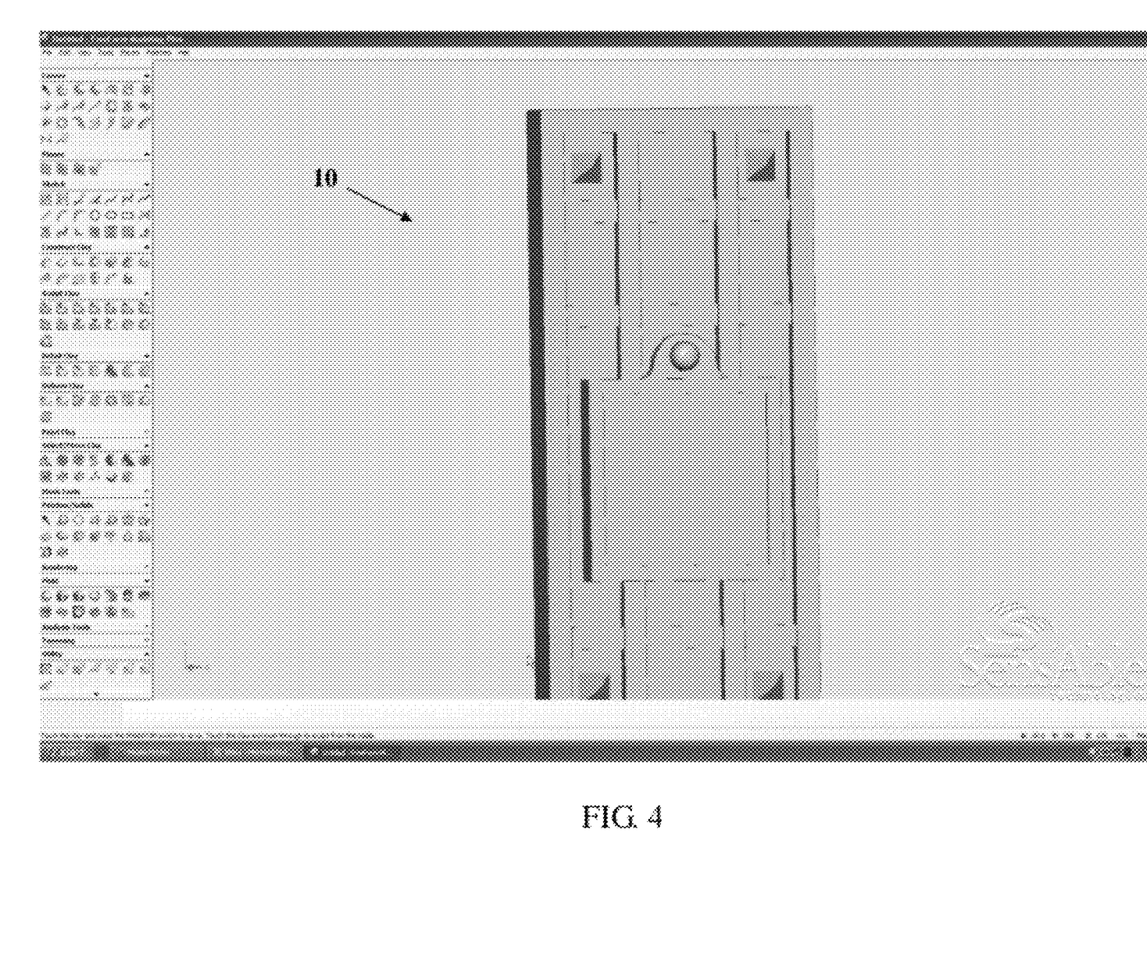
FIG. 4 is a screenshot of a model of a baseplate, in accordance with one embodiment of the invention.

A flowchart showing a method of creating a new detailed 3D solid model, in accordance with one embodiment of the invention, is shown in FIG. 3. As depicted, the method begins at step (A) where a solid model, such as the model of the baseplate 10 of FIG. 4, is provided. At step (B), a region is defined where detail will be added to the solid model. For example, referring to FIG. 5, a surface face 14 may be selected that represents the region of the solid model to be detailed. Note that, in the general case, the defined region need not correspond to a given predefined surface of the solid model. For example, in the solid model of a bottle 16 shown in FIG. 6, a region 18 to be detailed is defined by a closed boundary 20 of depicted curves 22.

Figure 5:
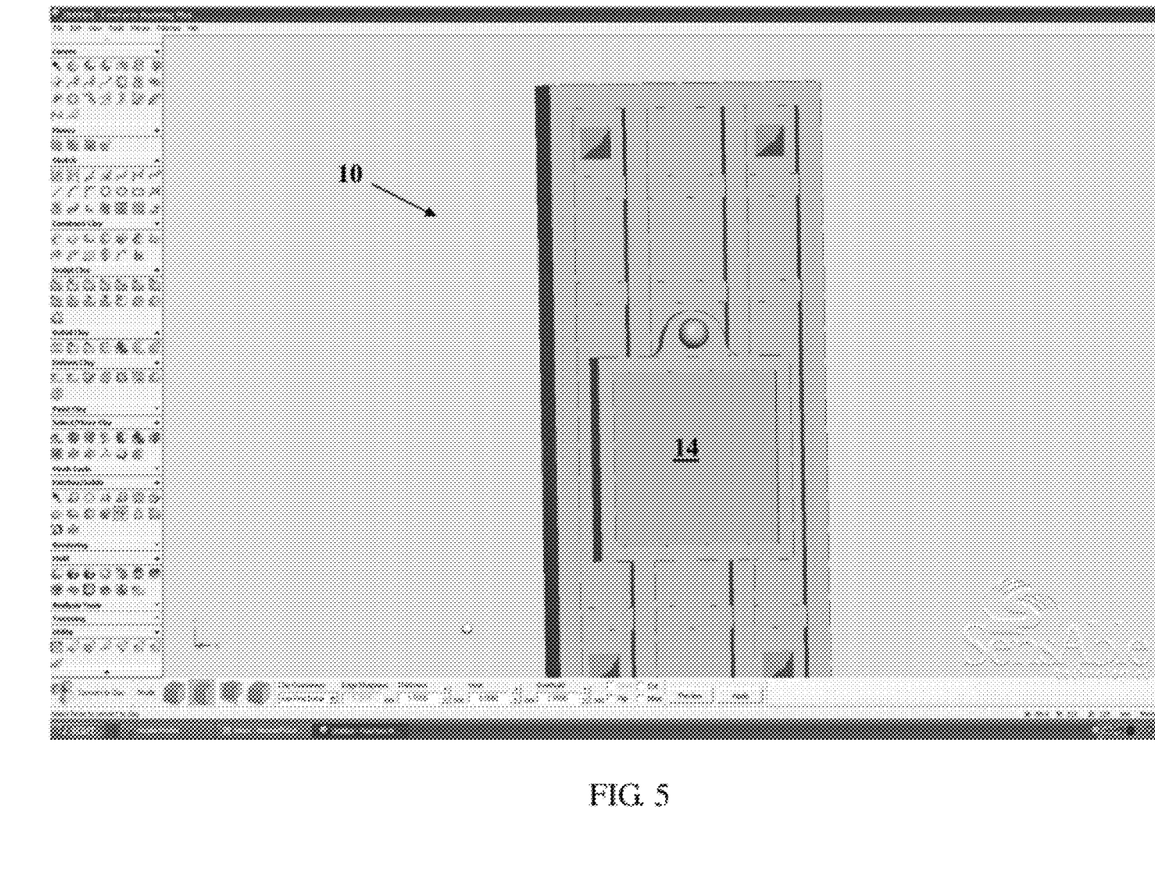
FIG. 5 is a screenshot of the model of FIG. 4 in which a region of the model to be detailed has been selected, in accordance with one embodiment of the invention.
Figure 7:
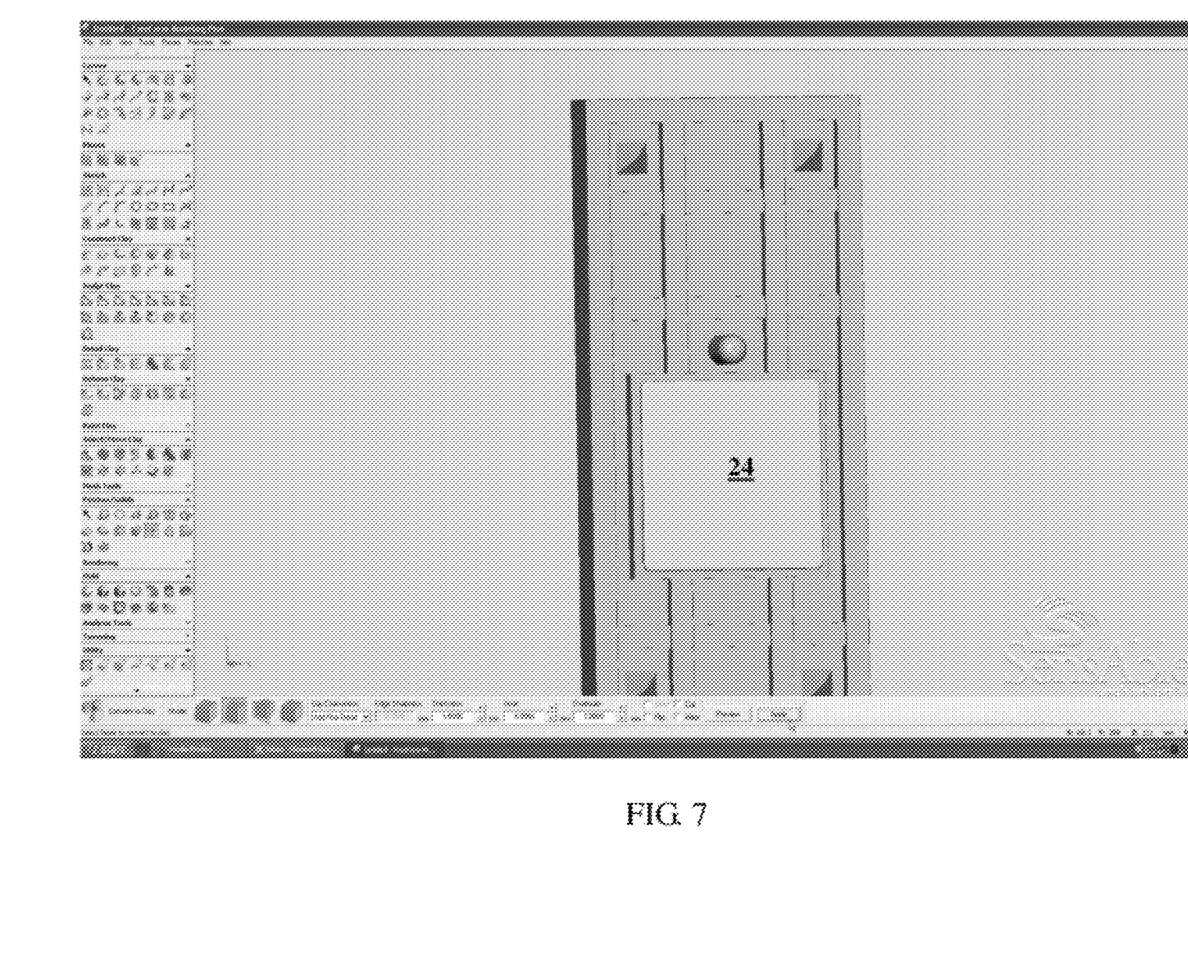
FIG. 7 is a screenshot of the model of FIG. 5 showing created voxels in the selected region, in accordance with one embodiment of the invention.

Next, at step (C), a secondary geometric representation is created based on the defined region, such as the surface face 14 in FIG. 5. In one embodiment of the invention, the secondary geometric representation is based on voxels. As noted earlier, however, the secondary geometric representation may also be based on mesh or point cloud geometry. A voxel-based secondary geometric representation 24 is depicted in FIG. 7.

Figure 8:
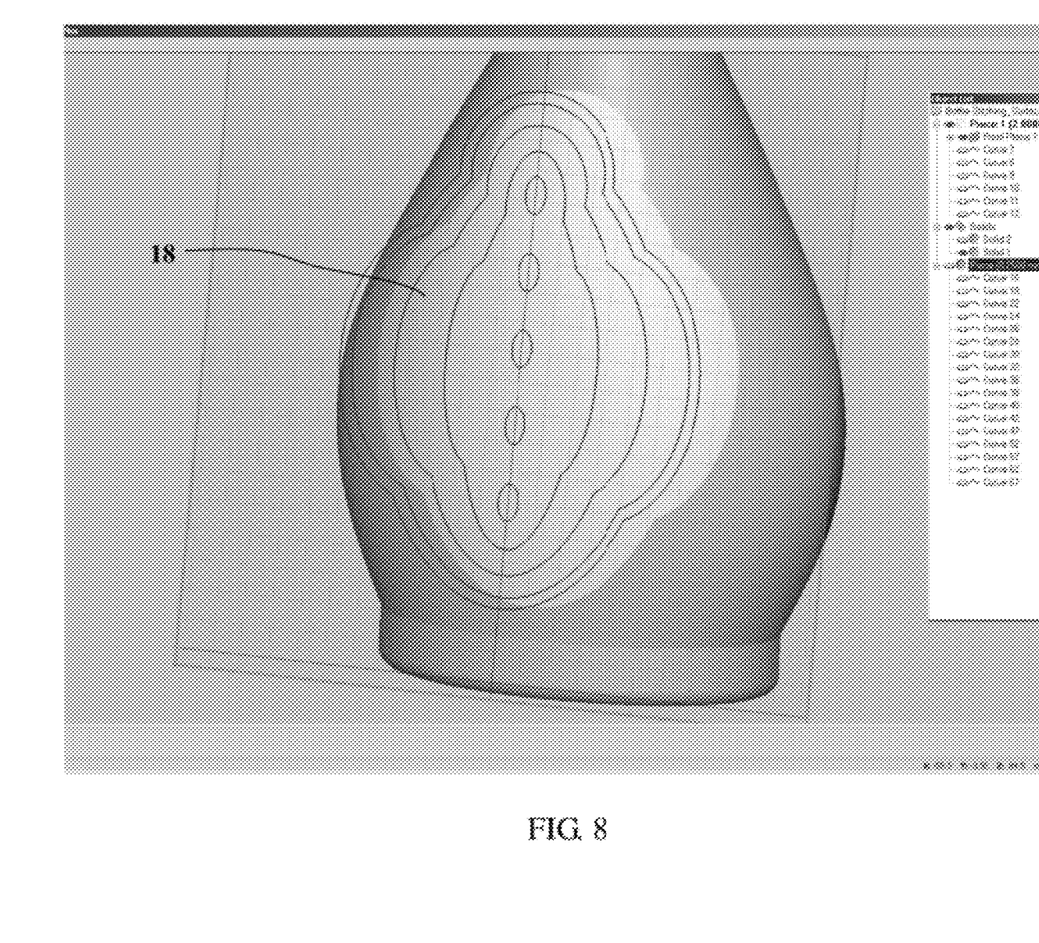
FIG. 8 is a screenshot of curves used to create a defined region on a solid model of a bottle, in accordance with one embodiment of the invention.
Figure 9:
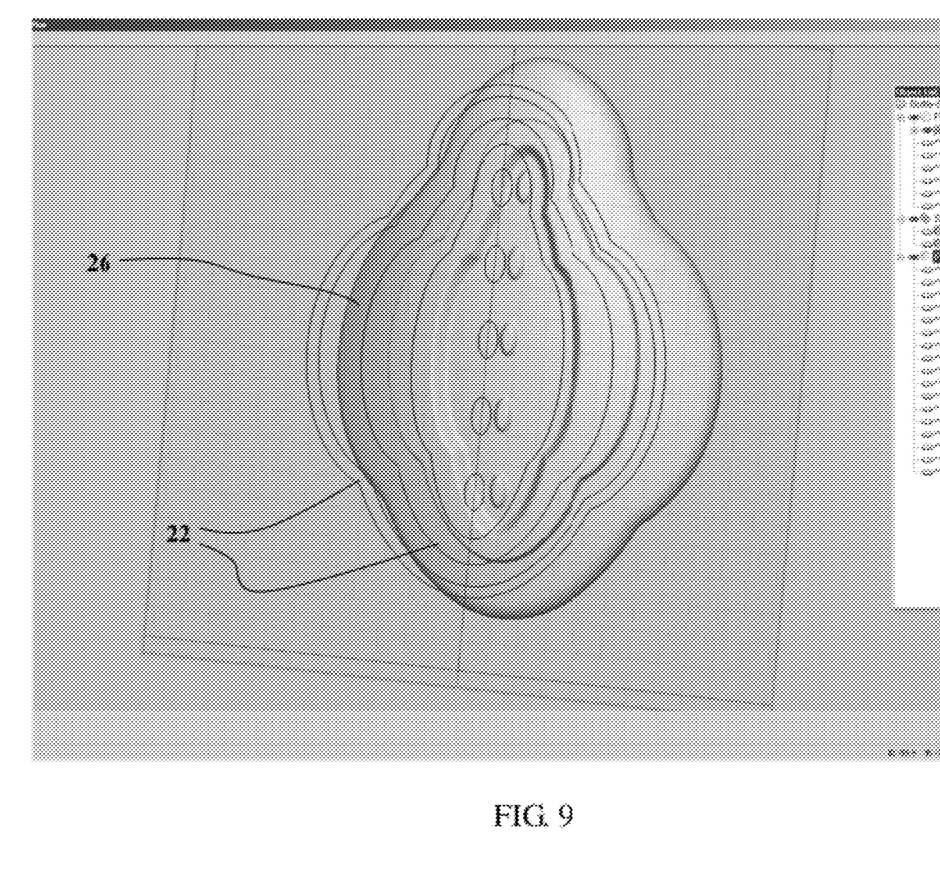
FIG. 9 is a screenshot of curves used to create a secondary geometric representation, in accordance with one embodiment of the invention.

Note that steps (B) and (C) from the flowchart of FIG. 3 can be combined into a single step. For example, in the case of the bottle 16, curves 22 may be drawn and used to create both the defined region 18 from step (B), as shown in FIG. 8, and a secondary geometric representation 26 from step (C), as shown in FIG. 9, in a single operation. As depicted in FIG. 9, the family of curves 22 used in steps (B) and (C) may also be used to define the detailing operation for the secondary geometric representation 26. In this embodiment, step (D) has been, in effect, combined with steps (B) and (C).

Figure 10:
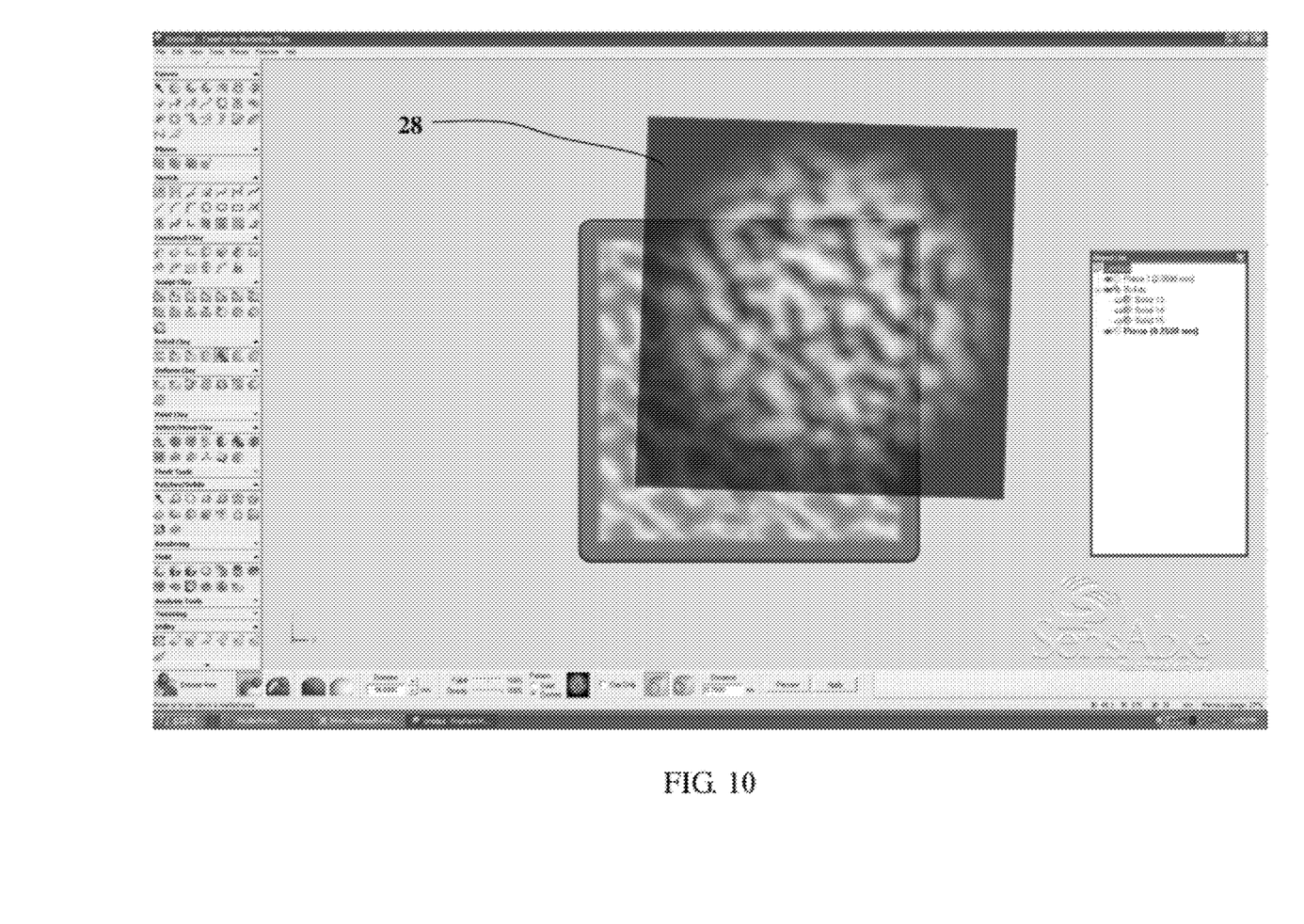
FIGS. 10 and 11 are screenshots of a series of textures being applied and debossed into voxels to create a textured pattern, in accordance with one embodiment of the invention.
Figure 11:
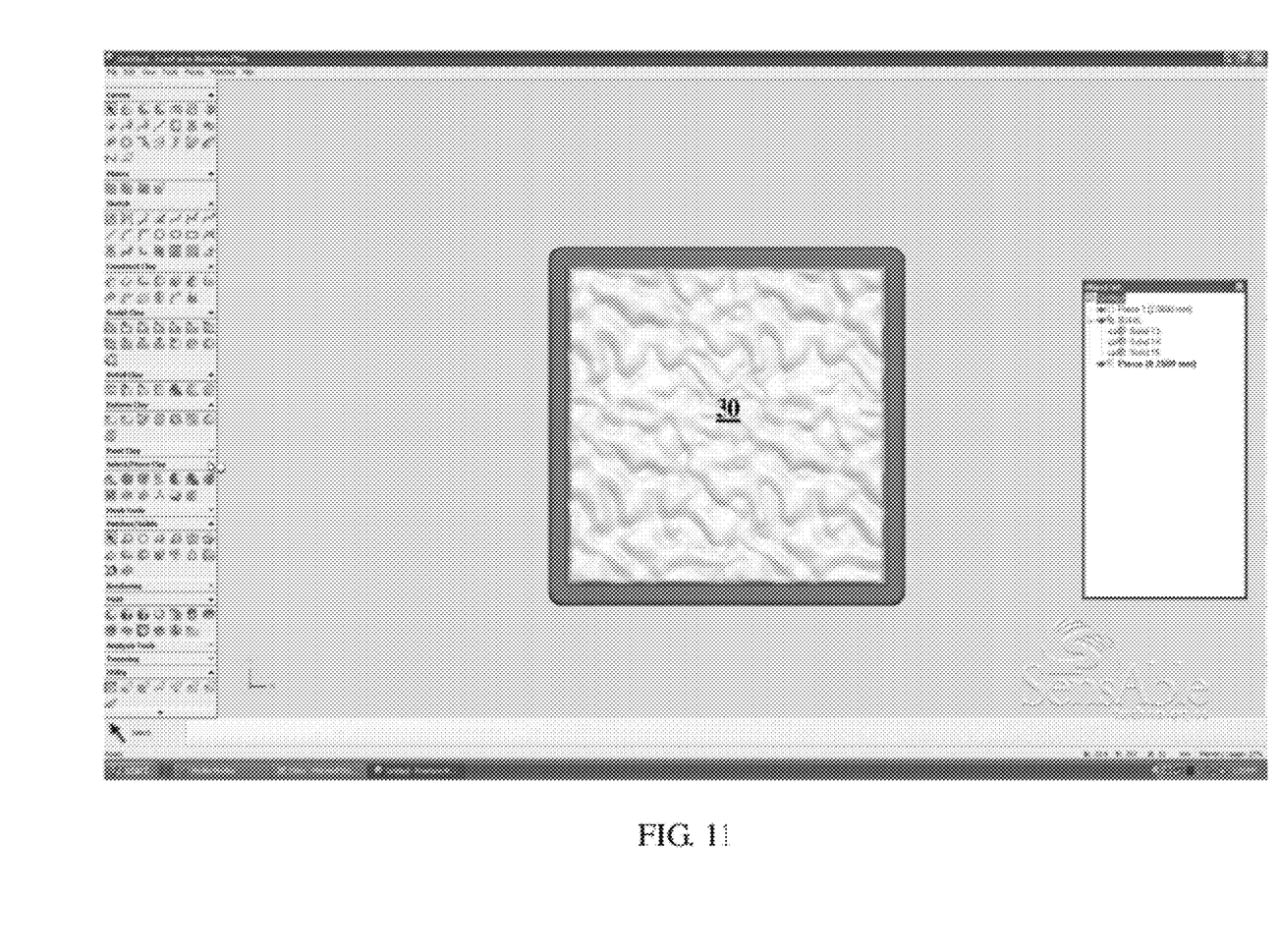

In certain embodiments, the actual detailing operations for the voxel model are performed using standard embossing, debossing, carving, or combining tools found, for example, in SensAble's FreeForm® software. As shown in FIGS. 10 and 11, a series of textures 28 can be applied and then debossed into the voxels to create a textured pattern 30.

At step (E), a new surface is created based on sampling the detailed secondary representation. In one embodiment, oversampling is performed to prepare the secondary representation before the new surface is created. For example, oversampling may be used to calculate a position and/or tangent for control points in the secondary representation. Oversampling may involve 40,000 control points or more, depending on a number of split tiles selected by a user, as described below. In one embodiment, the new surface is created without oversampling. Step (E) may also include trimming the surface to the same size and shape as the region defined in step (B).

Figure 12:
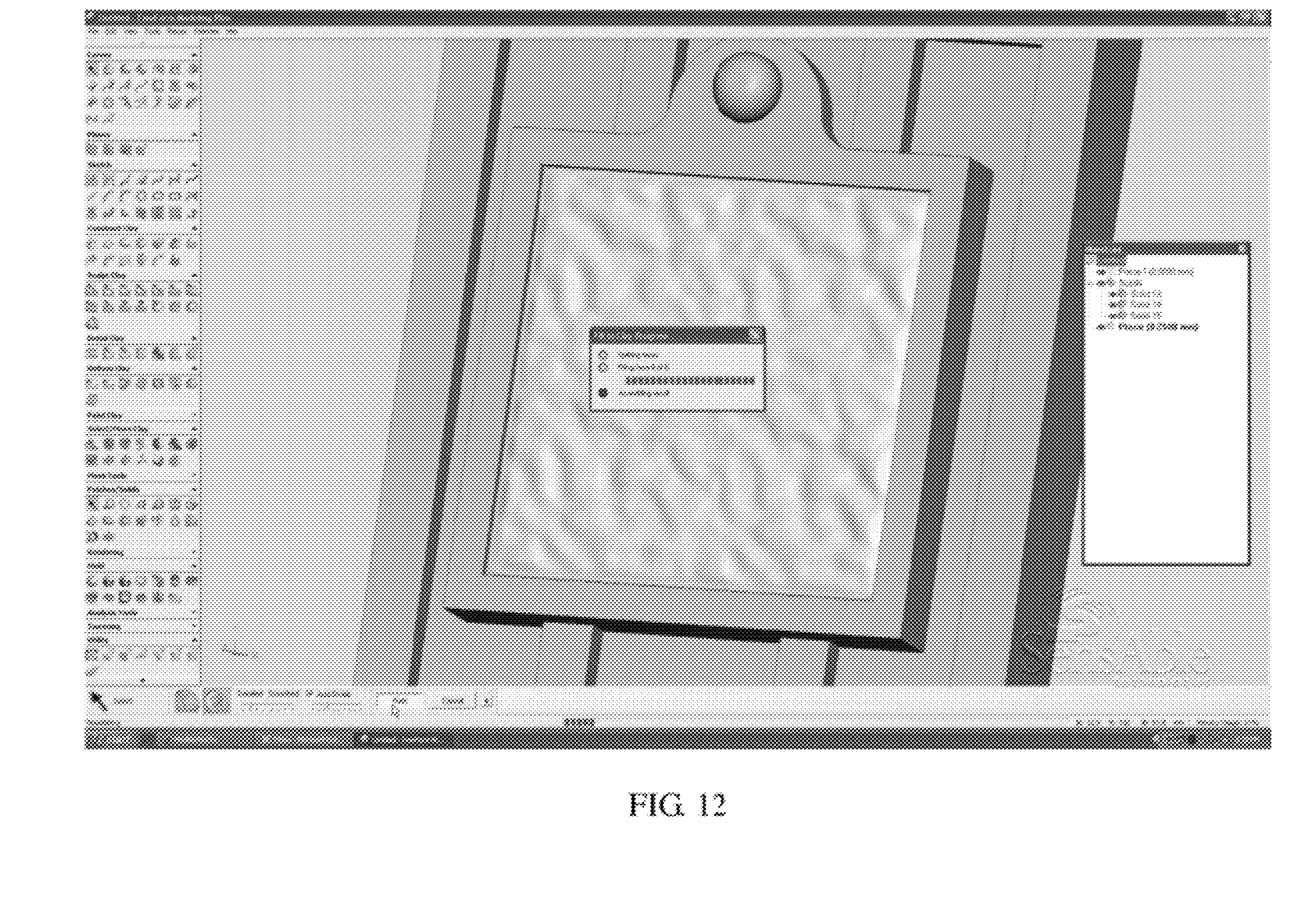
FIG. 12 is a screenshot of a selection of user controls for use in model creation, in accordance with one embodiment of the invention.

In another embodiment, the creation of the new surface is controlled by three separate parameters: (P1) an amount of smoothing of the secondary geometric representation, (P2) a number of split tiles for the region, and (P3) an amount of voxel oversampling within each tile. A selection of user controls, for one embodiment of the invention, is shown in FIG. 12.

Figure 6:
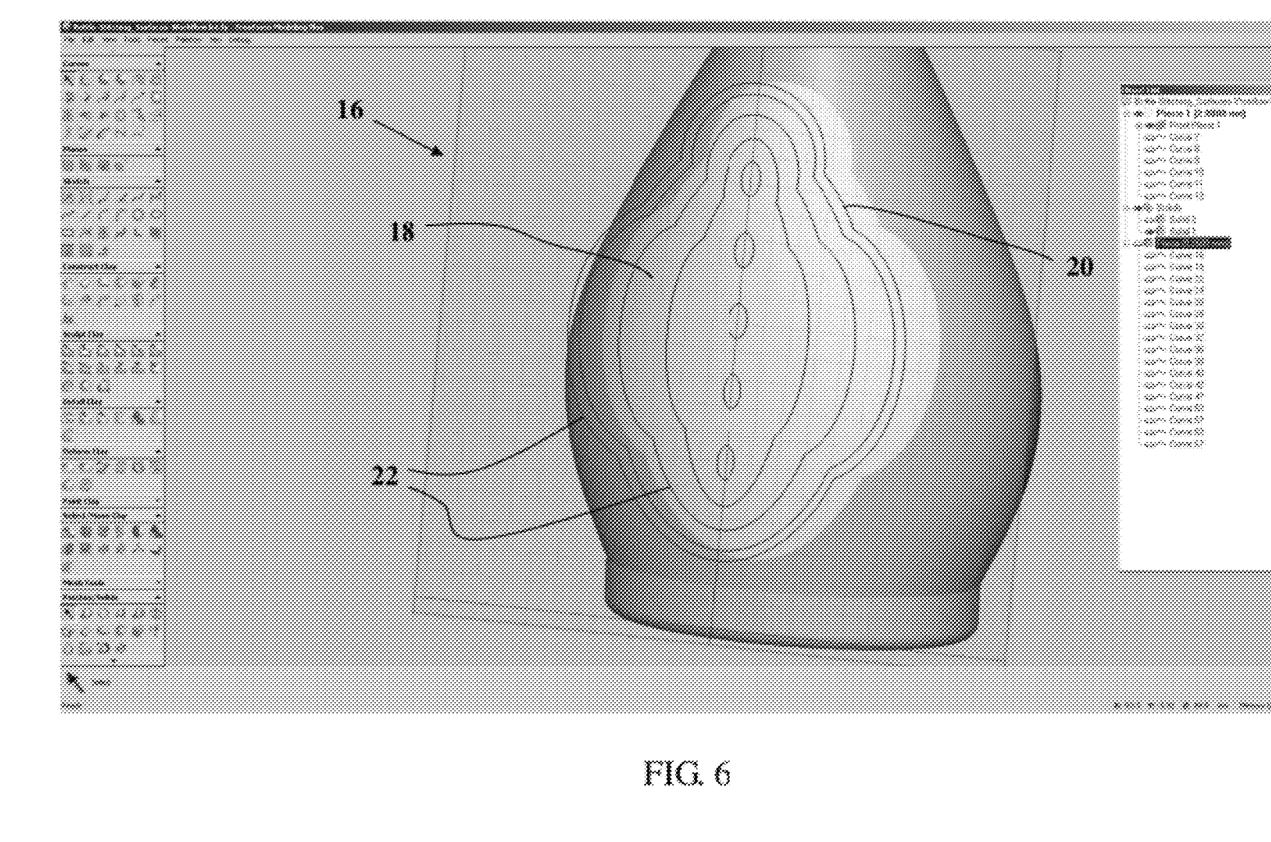
FIG. 6 is a screenshot from a graphics software application illustrating a model of a bottle, in accordance with one embodiment of the invention.
Figure 13:
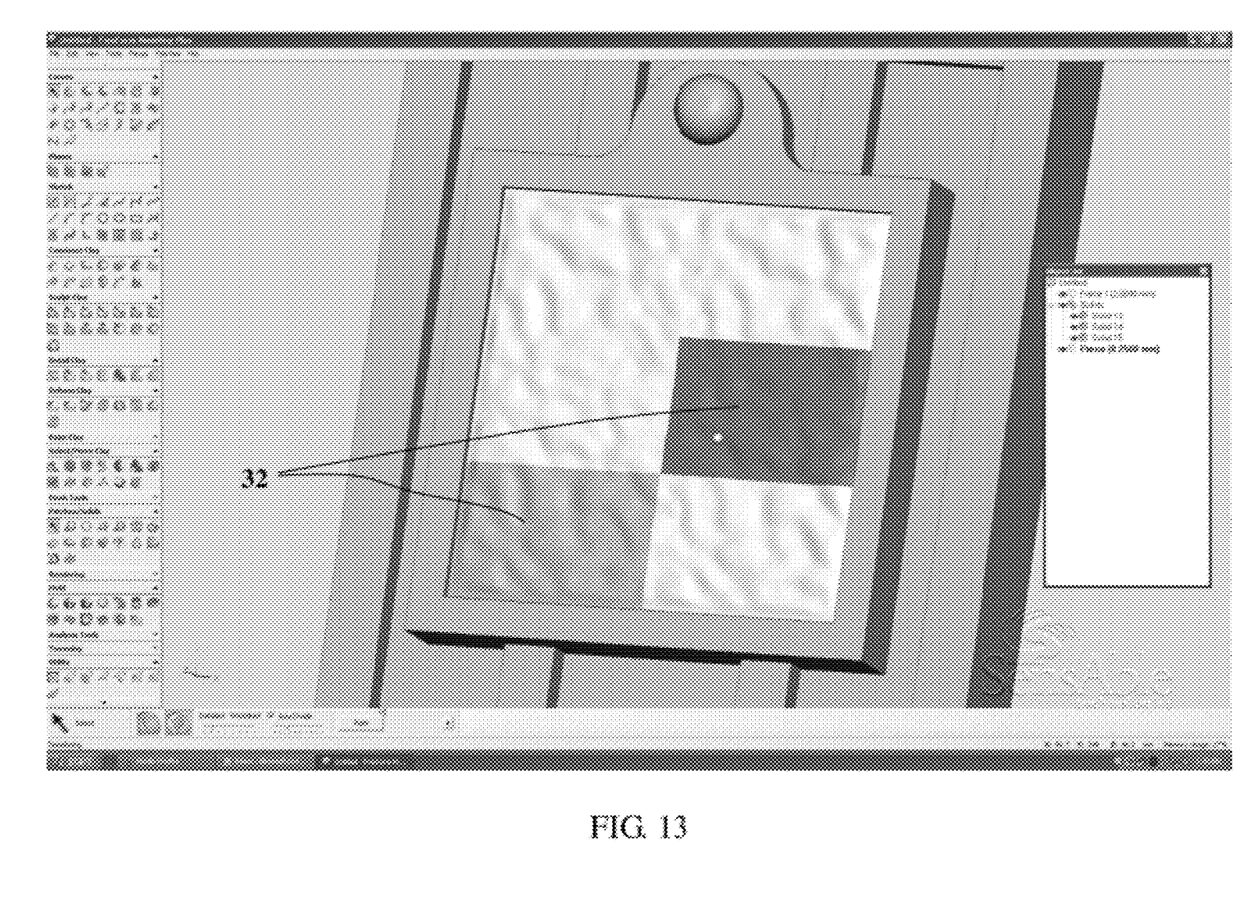
FIG. 13 is a screenshot of a defined region for a door baseplate that has been subdivided into six split tiles, in accordance with one embodiment of the invention.

Referring to FIG. 6, based on the values for the control parameters, a defined region, such as the surface face 14 in FIG. 5, may be subdivided into a plurality of split tiles. For example, six subdivided split tiles 32 are shown in FIG. 13. The use of split tiles may allow the new surface to better approximate the detail that was added to the secondary geometric representation in step (D). For example, rather than creating a single new NURBS surface that covers the entire region, a plurality of NURBS surfaces, one per tile, may be created and joined together to cover the region.

In one embodiment, to capture all of the detail that was added to the secondary geometric representation (e.g., in the beige voxels of FIG. 7), a plurality of NURBS surfaces are created by oversampling the voxel data. For example, the detailed secondary geometric representation may be oversampled to derive a location (x, y, z) and a surface normal $(N_x, N_y, N_z)$, at sub-voxel resolutions, for a new NURBS surface at each split tile. In one embodiment, the oversampling is done to capture the texture detail, which may be at "sub-voxel" resolution and may be performed by interpolating between textured voxels. The NURBS surfaces may pass through and/or approximate the voxels on the surface of the secondary geometric representation.

To minimize ripple patterns caused by variations in the surface normals, it may be useful to oversample and smooth the secondary geometric representation. The voxel representation that is used in the FreeForm® software is well suited to these kinds of operations, and a standard convolution algorithm, in which individual voxel locations are averaged by examining the nearest neighbors, may be employed.

After the new surface has been created in step (E), the new surface is integrated into the solid model at step (F). The integration is performed by matching the surface boundaries and tangents to produce C_0 and C_1 continuity.

Figure 14:
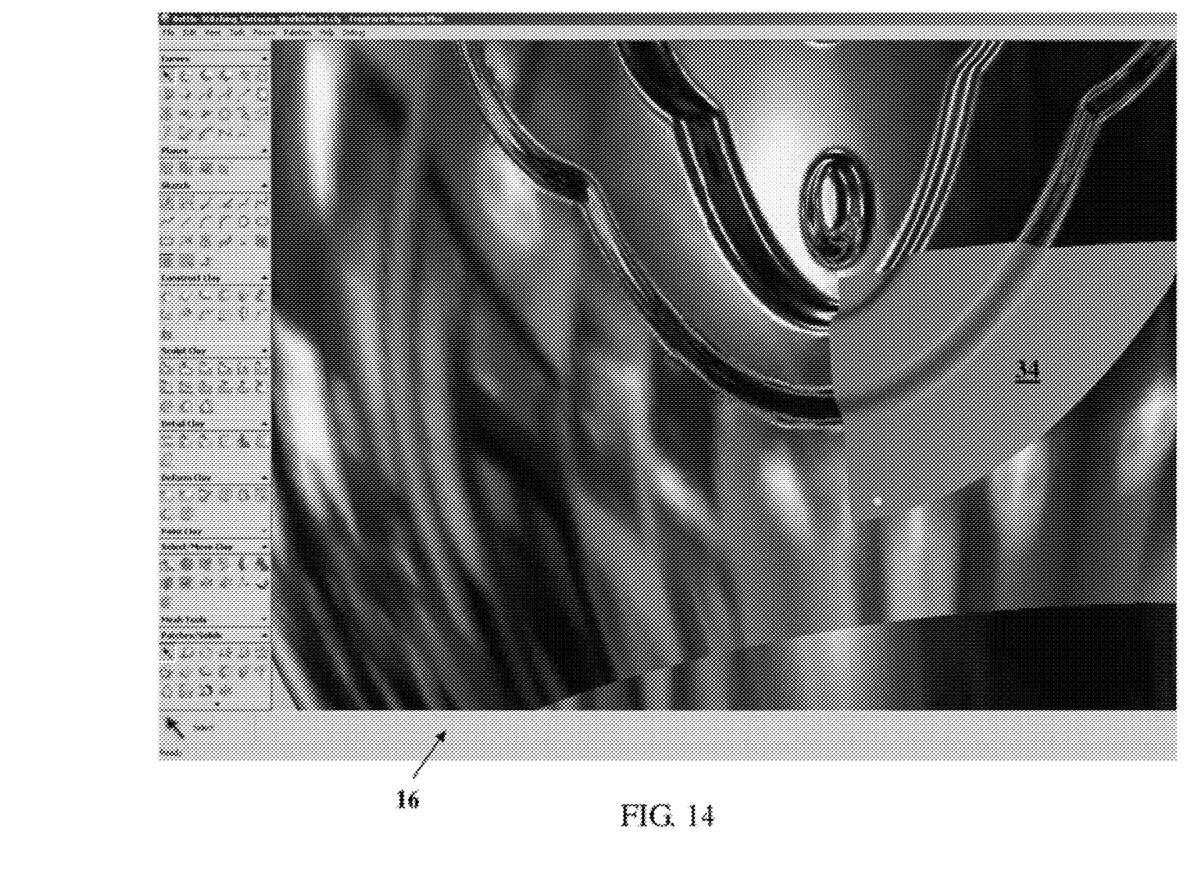
FIG. 14 is a screenshot of an environmental mapping technique being applied to a solid model, in accordance with one embodiment of the invention.

In another embodiment, to highlight small variations and ripples in the new detailed model, an environment mapping technique is used to simulate the solid model with a reflective, mirrored surface. For example, FIG. 14 depicts a detailed region of the bottle 16 that was created using 24 split faces and the methods describe above, including oversampling and smoothing. In alternative embodiments, larger or smaller numbers of split faces may be used. In one embodiment, the total time to complete the detailing operations for the solid bottle model is about 20 seconds. In alternative embodiments, faster or slower processing times may be achievable and/or advantageous, depending upon the specific model being detailed. A non-reflective region 34 of FIG. 14 shows a boundary between the new detailed region and an original surface from the solid model.

Figure 15:
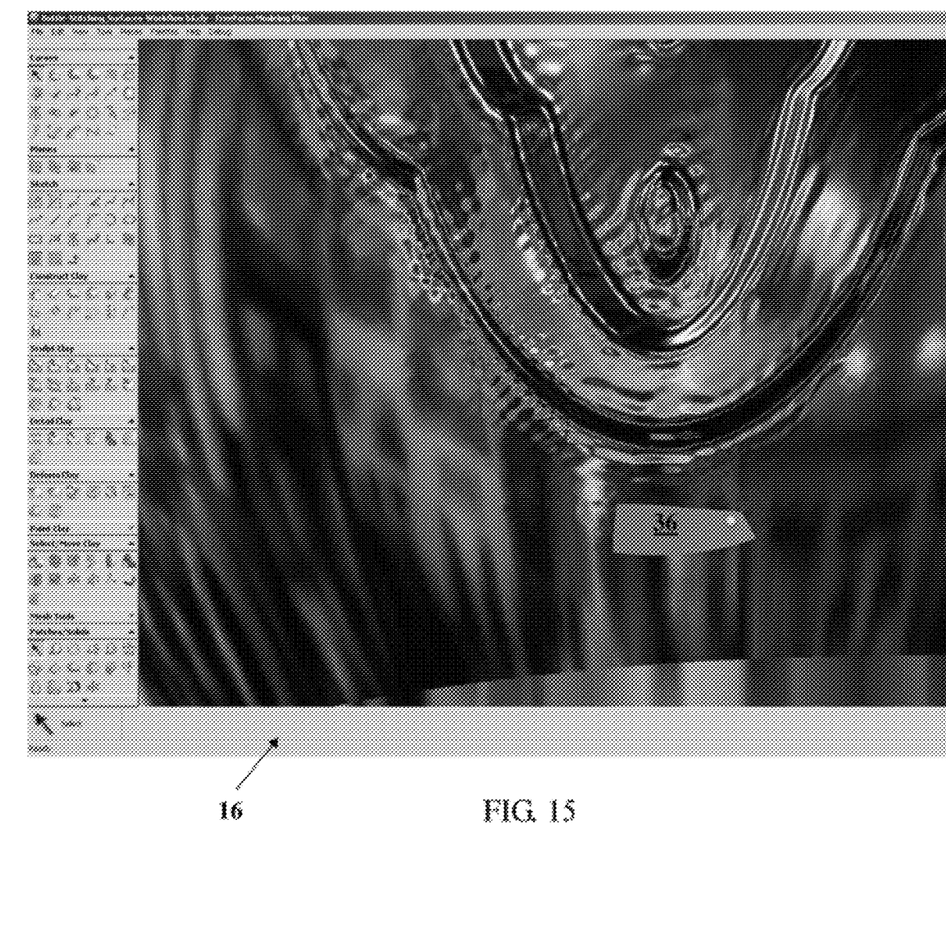
FIG. 15 is a screenshot of a surface created using a RapidForm® XOR surfacing library, in accordance with one embodiment of the invention.

A comparison of FIGS. 14 and 15 illustrates the effects of voxel oversampling and smoothing. FIG. 15 depicts a detailed region of the bottle 16 that was created using 100 split faces without oversampling or smoothing. The RapidForm® XOR surfacing library was utilized, and the results were stitched into the original solid model. The approximate time to complete this series of operations was about two minutes. Again, a non-reflective region 36 shows a boundary between the new detailed surface and the original surface from the solid model.

Embodiments of the invention may be used with methods and systems described in the following patents and/or applications, the texts of which are hereby incorporated by reference in their entirety: pending U.S. patent application Ser. No. 12/692,459, titled, "Haptically Enabled Coterminous Production of Prosthetics and Patient Preparations in Medical and Dental Applications," by Rawley et al.; pending U.S. patent application Ser. No. 12/321,766, titled, "Haptically Enabled Dental Modeling System," by Steingart et al., published as U.S. Patent Application Publication No. 2009/0248184; pending U.S. patent application Ser. No. 11/998,457, titled, "Systems for Haptic Design of Dental Restorations," by Steingart et al., published as U.S. Patent Application Publication No. 2008/0261165; pending U.S. patent application Ser. No. 11/998,877, titled, "Systems for Hybrid Geometric/Volumetric Representation of 3D Objects," by Faken et al., published as U.S. Patent Application Publication No. 2008/0246761; pending U.S. patent application Ser. No. 10/733,862, titled, "Apparatus and Methods for Wrapping Texture onto the surface of a Virtual Object," by Berger et al., published as U.S. Patent Application Publication No. 2005/0128211; U.S. Pat. No. 7,626,589, titled, "A Haptic Graphical User Interface for Adjusting Mapped Texture," by Berger; U.S. Pat. No. 7,149,596, titled, "Apparatus and Methods for Modifying a Model of an Object to Enforce Compliance with a Manufacturing Constraint," by Berger et al.; U.S. Pat. No. 6,958,752, titled, "Systems and Methods for Three-Dimensional Modeling," by Jennings, Jr. et al.; U.S. Pat. No. 6,867,770, titled, "Systems and Methods for Voxel Warping," by Payne; U.S. Pat. No. 6,421,048, titled, "Systems and Methods for Interacting With Virtual Objects in A Haptic Virtual Reality Environment," by Shih et al.; and U.S. Pat. No. 6,111,577, titled, "Method and Apparatus for Determining Forces to be Applied to a User Through a Haptic Interface," by Zilles et al.

EQUIVALENTS

While the invention has been particularly shown and described with reference to specific preferred embodiments, it should be understood by those skilled in the art that various changes in form and detail may be made therein without departing from the spirit and scope of the invention as defined by the appended claims. Insofar as this is a provisional application, what is considered applicants' invention is not necessarily limited to embodiments that fall within the claims below.

What is claimed is:

1. A system for detailing a graphical 3D solid model of an article displayed to a user, the system comprising:
   a graphical user interface device configured to receive input from a user and transmit the input to a computer, the computer comprising a Central Processing Unit (CPU) and/or a Graphics Processing Unit (GPU);
   a memory for use with the computer, the memory comprising computer software configured to:
   (a) identify a region of the 3D solid model of the article where detail is to be added, according to user input;
   (b) create a secondary geometric representation based on the identified region in (a), wherein the secondary geometric representation is a voxel-based representation;
   (c) add detail to the secondary geometric representation according to user input, wherein the addition of detail comprises at least one member selected from the group consisting of embossing, debossing, carving, acquiring, and/or adding 3D data, and texture mapping;
   (d) create a new surface by sampling the detailed secondary geometric representation at a sub-voxel resolution, wherein creation of the new surface is controlled with one or more of the following: (i) a level of smoothing of the secondary geometry; (ii) a number of split tiles for a trimmed region; and/or (iii) an amount of voxel oversampling within each of the split tiles; and
   (e) integrate the new surface in (d) into the 3D solid model using the region identified in (a), thereby producing a detailed 3D solid model; and
   a video display configured to graphically display the detailed 3D solid model to the user.

2. The system of claim 1, wherein the region where detail is to be added comprises a surface face.

3. The system of claim 1, wherein a curve defines at least one of the secondary geometric representation, the detail to be added to the region, and a boundary of the region where detail is to be added.

4. The system of claim 1, wherein the new surface created by sampling the geometric representation comprises a NURBS surface.

5. The system of claim 4, wherein the memory comprises computer software to derive a location and surface normal at a sub-voxel resolutions for the NURBS surface.

6. The system of claim 1, wherein the memory comprises computer software to oversample and smooth the secondary representation, thereby minimizing ripple patterns.

7. The system of claim 1, wherein the memory comprises computer software to create the new surface through the use of a convolution algorithm.

8. The system of claim 1, wherein the memory comprises computer software to simulate the new surface with a mirrored surface, thereby highlighting small variations and ripples.

9. The system of claim 1, wherein the memory comprises computer software to transfer the detail to the article, wherein the article is a manufacturing article.

10. The system of claim 9, wherein the manufacturing article is a mold.

11. The system of claim 1, wherein the graphical user interface is at least one of a joystick, a keyboard, a stylus, a roller ball, a touch screen, and/or a tablet.

* * * * *